United States Patent Office 2,913,474
Patented Nov. 17, 1959

2,913,474

BETA-CHLOROETHOXYETHYL-BIS (TRIMETHYL-SILOXY) METHYLSILANE

Donald L. Bailey, Snyder, N.Y., assignor to Union Carbide Corporation, a corporation of New York No Drawing. Application December 17, 1957
Serial No. 703,252

1 Claim. (Cl. 260—448.2)

This invention relates to a novel organosilicon compound. More particularly, the invention contemplates the provision of the specific organosilicon compound, beta - chloroethoxyethyl-bis(trimethylsiloxy)methylsilane, as represented by the following structural formula:

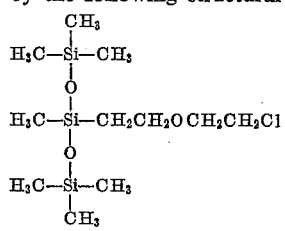

The invention is based on my discovery that the foregoing siloxane-ether structure can be synthesized by the thermal addition of heptamethyltrisiloxane $$[(Me_3SiO)_2Si(Me)H]$$

to (2-chloroethoxy) ethylene in the presence of a platinum catalyst. In essence, the synthesis involves the formation of a reaction mixture comprising the heptamethyltrisiloxane, (2 - chloroethoxy)ethylene, and a small amount of a platinum catalyst, followed by heating of the reaction mixture to cause the components to react under influence of the platinum catalyst to effect decomposition of the silanic hydrogen bond of the siloxane and addition of the resulting silyl and hydrogen free radicals to respective carbon atoms of the carbon to carbon multiple bond of the unsaturated organic ether, with the production of the desired compound as an adduct of the component reactants.

The starting material heptamethyltrisiloxane employed in synthesizing the novel compound of my invention may be produced by any one of several conventional procedures. Thus, it can be produced, for example, by the sulfuric acid catalyzed rearrangement of methylhydrogenpolysiloxane $[(MeSiHO)_x]$ with hexamethyldisiloxane $[Me_3SiOSiMe_3]$ as an endblocker. This equilibration may be accomplished by simply stirring the reactants at room temperature (25° C.) for a period of from four to eight hours in the presence of from 0.5 to 1 percent by weight of sulfuric acid, followed by suitable known measures for effecting catalyst removal.

The platinum catalyst used in promoting addition of the heptamethyltrisiloxane to the unsaturated organic ether, is preferably employed in finely-divided form either alone, or in combination with an inert support such as charcoal, and the like, or in the form of a multicomponent or heterogeneous catalyst consisting of platinum deposited on the gamma-allotrope of alumina-(platinum-on-gamma-alumina).

It is found that the relative concentration of platinum employed for catalyzing the addition reaction is not overly critical, but rather, concentrations of the elemental metal ranging from 0.001 part to about 5 parts by weight of the reactants can be employed and satisfactory results are obtained. In actual practice employing the metal in the form of the heterogeneous catalyst, platinum-on-gamma-alumina, I have found that concentrations of the order of one to two percent by weight of the heterogeneous substance, containing one to two percent by weight of elemental platinum, function admirably for the purpose intended.

In general, the reaction time and temperature of reaction are also relatively non-critical, and the reaction can be brought to completion with good yields of the adduct by heating the reactants at temperatures within the range 80–180° C. for periods ranging from about two to four hours. In actual practice, I prefer to operate at temperatures within the range 100–110° C. It is relatively essential, however, to effect stirring or agitation of the reaction mixture throughout the time of treatment in order to establish and maintain uniform dispersion of the solid catalyst within the liquid reaction phase.

The presence of a polar group within the compound of the invention, coupled with the relatively long hydrocarbon chain of the ether substituent, render it extremely useful as a modifier for silicone materials such as oils and elastomers, as well as for thermosetting resins. Thus, the polar group makes the compound useful for modifying silicone rubbers or thermosetting resins to contribute greater strength, greater cohesive and adhesive forces in bonding to other materials, greater solvent resistance, etc. In addition, the polar group permits utilization of the compound to impart greater lubricity to silicone oils, whereas the long hydrocarbon chain may be used to give silicone oils or polymers greater compatibility with organic oils or polymers. The compound, per se, is useful as a silicone oil, and may be employed, also to introduce the functional ether group into siloxanes in general by conventional equilibration techniques.

It is believed that the invention may be best understood by reference to the following specific example describing the foregoing principles and procedures as applied to the production of the novel compound of the invention:

EXAMPLE

*Preparation of beta - chloroethoxyethyl - bis(trimethylsiloxy)methylsilane*

$$[(Me_3SiO)_2Si(Me)(CH_2)_2O(CH_2)_2Cl]$$

*by addition of heptamethyltrisiloxane to vinyl-2-chloroethyl ether [(2-chloroethoxy)ethylene]*

A 500 cubic centimeter, round-bottom flask equipped with a stirrer, condenser and thermometer, was charged with 122 grams of heptamethyltrisiloxane (0.55 mole), 53.3 grams of vinyl-2-chloroethyl ether (0.5 mole) and 1.75 grams (1 weight percent) of two percent platinum-on-gamma-alumina catalyst. The mixture was heated at 105–110° C. with stirring for a total elapsed period of four hours. The catalyst was removed from the reaction product by centrifuging. Distillation of the product yielded the desired adduct, $$[(CH_3)_3SiO]_2Si(CH_3)CH_2CH_2—O—CH_2CH_2Cl$$

in amount of 73.3 grams (71% yield based on reacted $CH_2=CH—O—CH_2CH_2Cl$). The compound yielded the following physical and analytical data: boiling point 127–128° C. at 9–10 mm.; refractive index $(n_D^{25})$ of 1.4180; and density $(d_{25})$ of 0.927

|  | Percent Cl |
|---|---|
| Found | 11.17 |
| Theoretical $(C_{11}H_{29}O_3SiCl)$ | 10.80 |

Having thus described the subject matter of my invention, what it is desired to secure by Letters Patent is:

Beta - chloroethoxyethyl - bis(trimethylsiloxy) methylsilane.

References Cited in the file of this patent

UNITED STATES PATENTS

| 2,823,218 | Speier et al. | Feb. 11, 1958 |
| 2,846,458 | Haluska | Aug. 5, 1958 |